(12) United States Patent
Fukuda et al.

(10) Patent No.: US 8,084,956 B2
(45) Date of Patent: Dec. 27, 2011

(54) APPARATUS AND METHOD FOR AUTOMATICALLY TRIMMING AN OUTPUT PARAMETER OF AN ELECTRONIC BALLAST

(75) Inventors: Kenichi Fukuda, Burlington, MA (US); Yiyoung Sun, Beverly, MA (US)

(73) Assignee: Panasonic Electric Works Co., Ltd., Osaka (JP)

( * ) Notice: Subject to any disclaimer, the term of this patent is extended or adjusted under 35 U.S.C. 154(b) by 503 days.

(21) Appl. No.: 12/104,789

(22) Filed: Apr. 17, 2008

(65) Prior Publication Data

US 2009/0261749 A1 Oct. 22, 2009

(51) Int. Cl.
*H05B 37/02* (2006.01)

(52) U.S. Cl. ........................................ 315/291; 315/246

(58) Field of Classification Search .............. 315/209 R, 315/224–226, 246, 291, 307, 308, 310
See application file for complete search history.

(56) References Cited

U.S. PATENT DOCUMENTS

| | | | |
|---|---|---|---|
| 5,117,178 A * | 5/1992 | Roth | 323/320 |
| 7,075,254 B2 * | 7/2006 | Chitta et al. | 315/307 |
| 7,622,904 B2 * | 11/2009 | Sutardja et al. | 323/282 |
| 2002/0047609 A1 | 4/2002 | Weng | |
| 2002/0190665 A1 | 12/2002 | Sun | |
| 2004/0183463 A1 | 9/2004 | Sun et al. | |
| 2007/0063659 A1 | 3/2007 | Yamashita et al. | |
| 2007/0210723 A1 | 9/2007 | Kumagai et al. | |
| 2008/0180037 A1 * | 7/2008 | Srimuang | 315/246 |
| 2009/0273296 A1 * | 11/2009 | Veskovic et al. | 315/246 |

* cited by examiner

*Primary Examiner* — Thuy Vinh Tran
(74) *Attorney, Agent, or Firm* — Greenblum & Bernstein, P.L.C.

(57) ABSTRACT

An electronic ballast includes a microprocessor which is programmed to read a voltage value corresponding to an output of the electronic ballast, output a signal which controls an amount of power outputted by the electronic ballast in accordance with the voltage value, read an external voltage value, and select one of a trimming mode and a normal mode as an operating mode based on the external voltage value. The microprocessor is also programmed, when operating in the trimming mode, to set an internal reference value, compare the voltage value corresponding to the output of the electronic ballast with the internal reference value, trim an amount of power outputted by the electronic ballast to a resistor corresponding to an impedance of a High Intensity Discharge lamp by adjusting the signal based upon the comparison, and store a result of the signal adjustment.

23 Claims, 6 Drawing Sheets

Circuit arrangement in the trimming mode

Circuit arrangement in the normal mode

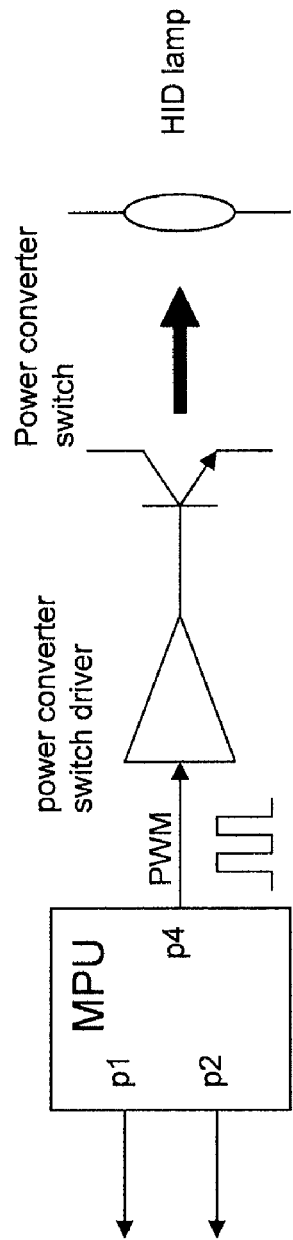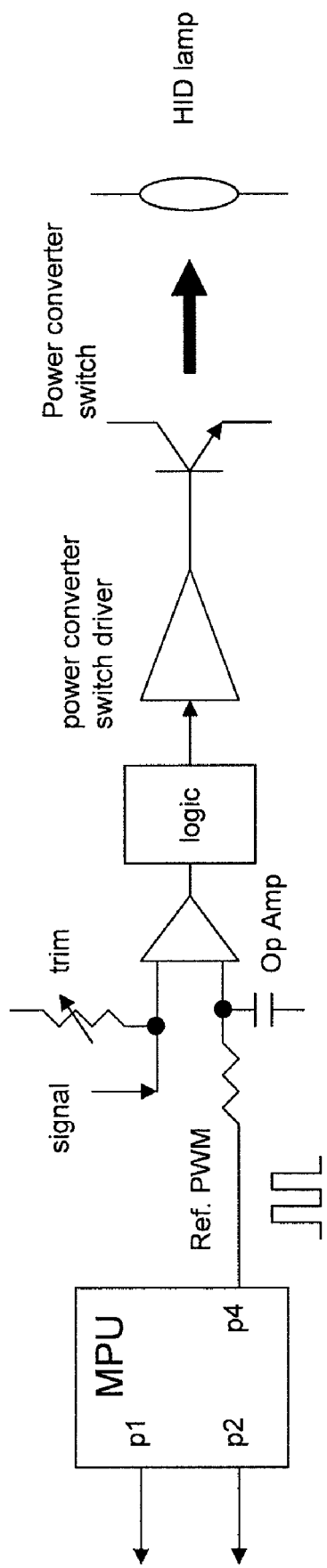

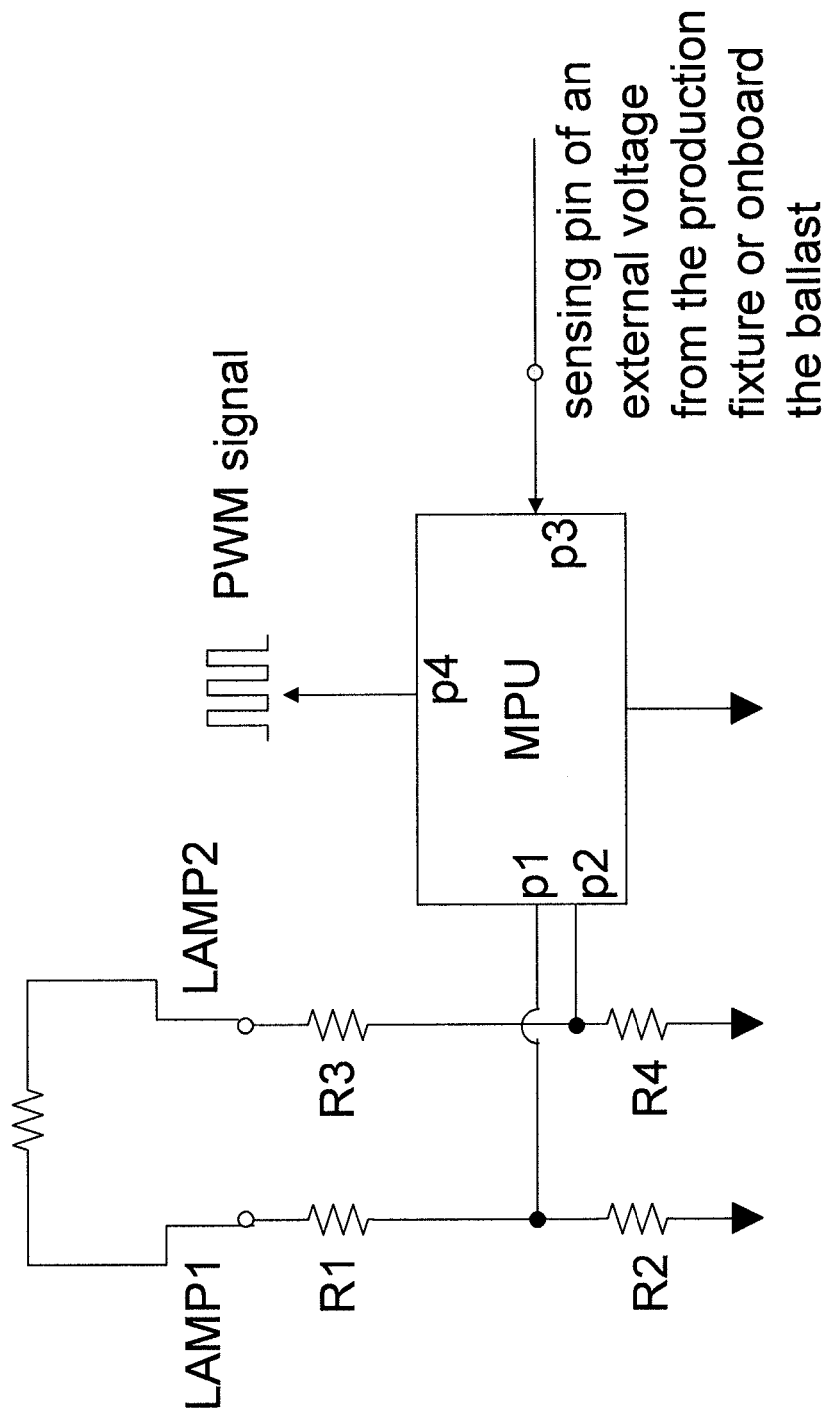
Figure 2A: Circuit arrangement in the trimming mode

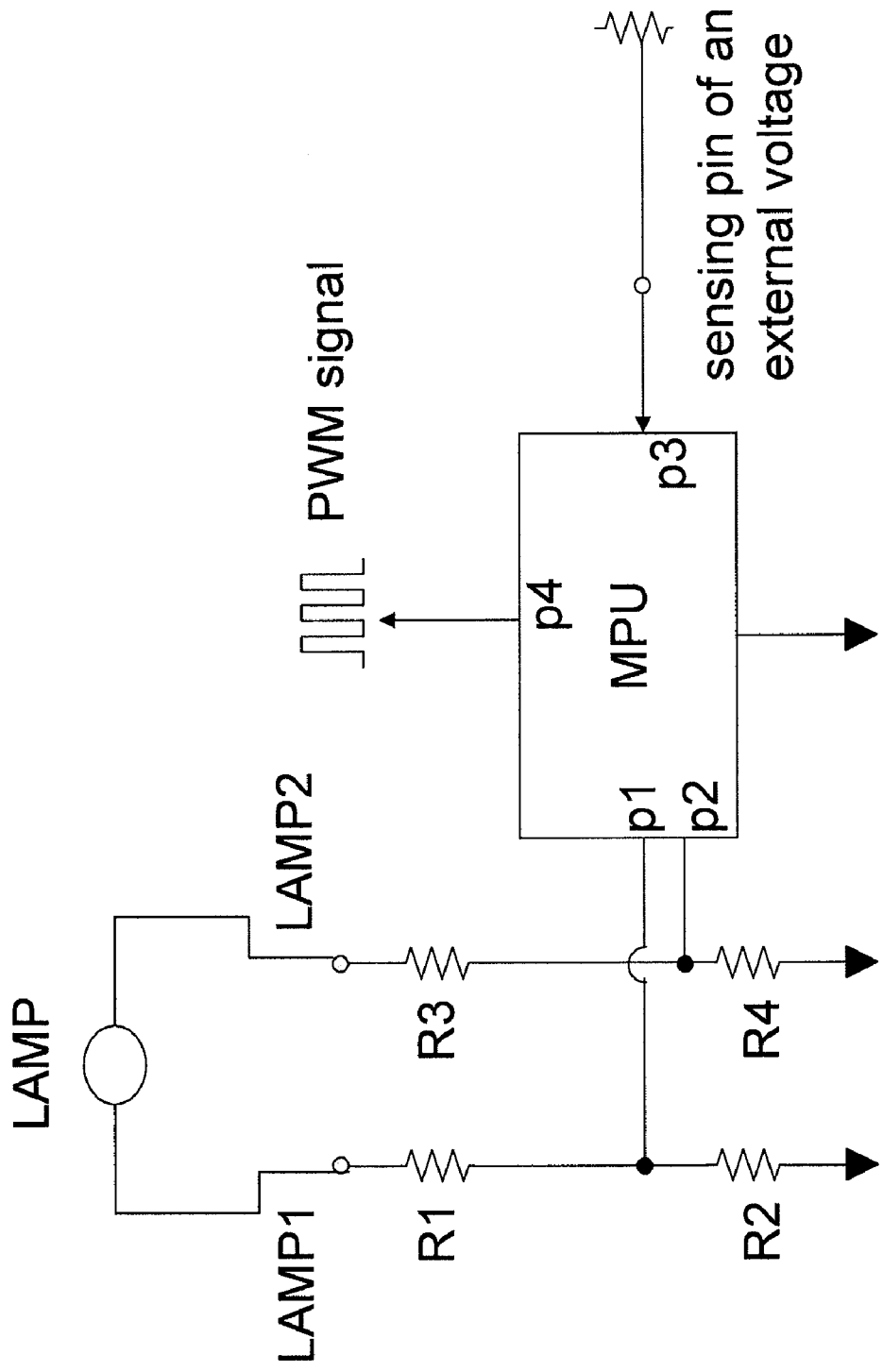
Figure 2B: Circuit arrangement in the normal mode

APPARATUS AND METHOD FOR AUTOMATICALLY TRIMMING AN OUTPUT PARAMETER OF AN ELECTRONIC BALLAST

BACKGROUND OF THE INVENTION

1. Field of the Invention

The present invention relates to the field of High Intensity Discharge (HID) lamps, and more particularly, to electronic ballast of such lamps.

2. Description of the Related Art

FIG. 1A is a schematic diagram of a conventional electronic ballast of an HID lamp. In this ballast, a microprocessor (MPU) reads a scaled down voltage of the HID lamp, and outputs a pulse width modulation (PWM) signal to a power converter switch driver, which drives a power converter switch. The MPU varies the duty cycle of the PWM signal in accordance with the scaled down voltage of the HID lamp, and may set the duty cycle based on values in a lookup table of the MPU, for example. The power converter switch provides power to the HID lamp in accordance with the PWM signal.

The power outputted from the ballast to the HID lamp is a function of the duty cycle of the PWM signal. However, due to component tolerances of the ballast, such as a voltage divider resistor tolerance, a tolerance of an analog to digital converter, a power inductor tolerance, and circuit delay, the output power can widely vary from one ballast to another. For example, the output power of a 70 W ballast can vary between 60 W and 80 W. Thus, the output of the ballast is not only a function of the duty cycle of the PWM signal, but also is a function of the component tolerances.

To minimize the output power variations among ballasts, components with tight tolerances can be used. However, a disadvantage of such a design is the associated increase in cost.

FIG. 1B is a schematic diagram of a second type of conventional electronic ballast of an HID lamp. In this ballast, a MPU does not output a PWM signal directly to a power converter switch driver, as in the ballast shown in FIG. 1A. Instead, the MPU outputs a PWM signal to an input of an operational amplifier. The duty cycle of the PWM varies in accordance with the scaled voltage of the HID lamp, and may be set, for example, based on values in a lookup table of the MPU. The second type of the conventional electronic ballast has the same component tolerance issue as the first type of conventional electronic ballast. However, to minimize the output power variation, a potentiometer is connected to a second input of the operational amplifier, and is used to trim the output of the power converter switch.

FIG. 1C is a schematic diagram of the second type of conventional electronic ballast when it is in a trimming mode. To trim the output of the second type of ballast, the ballast output is connected to a fixed resistor, rather than an HID lamp. Typically, the resistance of the resistor corresponds to an HID lamp impedance at a nominal wattage. An operator measures the output power of the ballast, and turns the potentiometer to trim the output power until he or she determines that it has reached an acceptable value.

A disadvantage of this ballast is that the potentiometer can be adjusted to compensate for error at only one set point, typically the impedance at nominal lamp wattage. However, the lamp impedance is not a constant value during the entire time the lamp is in operation. Thus, the MPU cannot provide an accurate ballast output throughout the entire time the lamp is in operation.

SUMMARY OF THE INVENTION

A feature of the present invention is that it allows an electronic ballast output to be automatically and effectively trimmed, without the above-noted drawbacks of the related art.

This may be implemented with an electronic ballast which includes a microprocessor which is programmed to read a voltage value corresponding to an output of the electronic ballast, output a signal which controls an amount of power outputted by the electronic ballast in accordance with the voltage value, read an external voltage value, and select one of a trimming mode and a normal mode as an operating mode based on the external voltage value. The microprocessor is also programmed, when operating in the trimming mode, to set an internal reference value, compare the voltage value corresponding to the output of the electronic ballast with the internal reference value, trim an amount of power outputted by the electronic ballast to a resistor corresponding to an impedance of an HID lamp by adjusting the signal based upon the comparison, and store a result of the signal adjustment.

The microprocessor may be programmed to set the internal reference proportional to the external voltage value. The signal may be a PWM signal. When operating in the trimming mode, the microprocessor may adjust a duty cycle of the PWM signal based upon the comparison. When in the trimming mode, the microprocessor may adjust the duty cycle of the PWM signal if a difference between the voltage value corresponding to the output of the electronic ballast and the internal reference value is outside a preset range. When in the trimming mode, the microprocessor may adjust the duty cycle of the PWM signal by applying a duty cycle offset to a prior duty cycle of the PWM signal.

When in the trimming mode, the microprocessor may store an offset value in a memory. The offset value may be one of a final adjusted duty cycle and a final duty cycle offset. The external voltage source may be provided in the electronic ballast.

When operating in the normal mode, the microprocessor may re-scale the result of the signal adjustment performed in the trimming mode based upon a difference between the impedance of the resistor and an impedance of an HID lamp connected to the electronic ballast in the normal mode. When operating in the normal mode, the microprocessor may output a signal which controls an amount of power to an HID lamp in accordance with a voltage corresponding to the electronic ballast output and the result of the signal adjustment performed in the trimming mode.

The foregoing and other objects, features, aspects and advantage of the present invention will become more apparent from the following detailed description of the present invention when taken in conjunction with the accompanying drawings.

BRIEF DESCRIPTION OF THE DRAWINGS

FIG. 1A is a schematic diagram of a first type of conventional electronic ballast of an HID lamp;

FIG. 1B is a schematic diagram of a second type of conventional electronic ballast of an HID lamp;

FIG. 2A is a schematic diagram of an embodiment of an electronic ballast of the present invention when it is in the trimming mode;

FIG. 2B is a schematic diagram of an embodiment of an electronic ballast of the present invention when it is in the normal mode;

DETAILED DESCRIPTION OF THE INVENTION

Figure 1C:
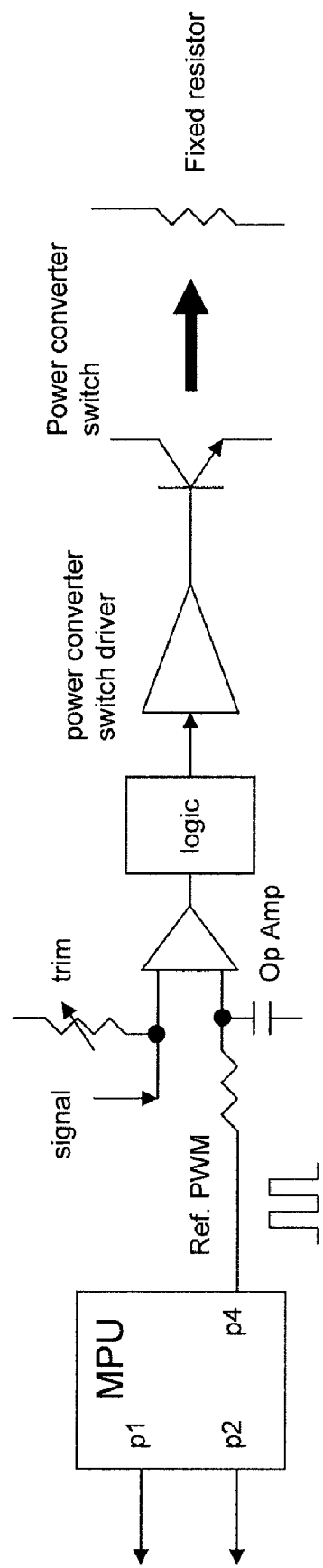
FIG. 1C is a schematic diagram of a second type of conventional electronic ballast when it is in the trimming mode.

FIG. 2A is a schematic diagram of an embodiment of an electronic ballast of the present invention when it is in the trimming mode. As shown in FIG. 2A, a voltage divider network made up of resistors R1-R4 is connected to output terminals LAMP1 and LAMP2 of the ballast, and a fixed resistor RL is connected across the terminals LAMP1 and LAMP2. The resistance of the resistor RL corresponds approximately to an impedance of an HID lamp at a nominal wattage. A MPU of the ballast includes a sensing pin which receives an external voltage. The external voltage may be provided, for example, by a voltage source onboard the ballast, or from a production fixture. A specific voltage of the external voltage, which is read via an internal analog to digital converter, tells the MPU that it is in the trimming mode. The MPU then generates an initial duty cycle of the PWM signal to output an amount of power to the resistor RL of the electronic ballast terminals. The voltage divider network provides a scaled down voltage value of the ballast output, corresponding to a voltage across the resistor RL, to the MPU. The MPU reads the scaled down voltage value via an internal analog to digital converter, and generates an second duty cycle of the PWM signal, which may be set, for example, by picking up the value composed of the on-width of the duty cycle of the PWM signal from a lookup table of the MPU in accordance with the scaled down voltage value.

The external voltage is also utilized for a target voltage value. The MPU reads the external voltage, and sets an internal reference value proportional to the external voltage value. The internal reference value is compared with the scaled down voltage value. If a difference between the internal reference value and the scaled down voltage value is outside a preset range in the MPU, the MPU adjusts the duty cycle of the PWM signal based upon the difference. This can be performed, for example, by applying a duty cycle offset to the second duty cycle of the PWM signal.

When the duty cycle of the PWM signal is adjusted, this causes the scaled down voltage value to move closer to the internal reference value. The MPU measures the new scaled down voltage value and compares it to the internal reference value. If the difference between the internal reference value and the new scaled down voltage value is still out of the preset range, the MPU again adjusts the duty cycle of the PWM signal based upon the difference, for example, by increasing or decreasing the duty offset. This process repeats until the difference between the internal reference value and the scaled down voltage is within the preset range.

When the difference between the internal reference value and the scaled down voltage is within the preset range, the duty cycle of the PWM signal is a final value. The MPU stores the final duty cycle offset in a memory, such as an EEPROM.

However, if the MPU is unable to adjust so that the difference between the internal reference value and the scaled down voltage is within the preset range, the MPU may shut off the ballast, and signal an operator that a target scaled down voltage has not been achieved.

As an alternative to comparing the scaled down voltage value directly with the internal reference value, the MPU may compare ratios. For example, the internal reference value may be 1.9V, and a desired scaled down lamp voltage may be 0.95V. Thus, in this case, a desired ratio of the internal reference value and the desired scaled down lamp voltage would be 1.9/0.95=2. If the initial scaled down lamp voltage is 1.0V, the initial ratio would be 1.9/1.0=1.9. If the preset range is set 0.00 to 0.05, in this case, the difference between the desired ratio of 2 and the measured ratio of 1.9 would be 2.0−1.9=0.1, which is out of the preset range. Thus, the MPU would apply an offset to the duty cycle of the PWM signal to lower the lamp voltage.

In an alternative embodiment, the MPU can have an internal reference value set in its code instead of being set by reading the external voltage value. But in this case, the tolerance of an analog to digital converter, among other factors, has to be very small. On the other hand, if the internal reference value is generated by reading a external voltage, the tolerance of an analog to digital converter, among other factors, can be relatively compensated for.

FIG. 2B is a schematic diagram of an embodiment of an electronic ballast of the present invention when it is in the normal mode. An HID lamp is connected across the terminals LAMP1 and LAMP2. A specific voltage of the external voltage tells the MPU that it is in the normal mode. The voltage divider network provides a scaled down voltage value of the ballast output, corresponding to a voltage across the HID lamp, to the MPU. The MPU then generates an adjusted duty cycle of the PWM signal by picking up a value from a lookup table of the MPU composed of an on-width of the duty cycle in accordance with the scaled down voltage value and then combines the value from the lookup table with the stored final duty cycle offset value obtained in the trimming mode. The lookup table may contain a number of values related to voltage values corresponding to an electronic ballast output through an entire operating range. For example, throughout the operating range of the electronic ballast, its output may vary from A volts to Z volts. A corresponding value in the lookup table for generating a on-width of the PWM signal may vary accordingly from a to z.

The final duty cycle offset obtained in the trimming mode is based on the resistance of the fixed resistor RL, which corresponds approximately to an impedance of an HID lamp at nominal wattage. However, the impedance of the HID lamp may vary during the time the HID lamp is in operation. Therefore, if the MPU directly applies the stored final duty cycle offset in the memory to the values from the lookup table corresponding to the scaled down voltage, the ratio between the stored final duty cycle offset and the value at the nominal impedance is different from the one between the stored final duty cycle and values at any non-nominal impedance. To have more accurate operation, the MPU may be programmed to compensate the final duty offset in accordance with the scaled down voltage to have the same ratio between a compensated final duty cycle offset and a value from lookup table in the entire operating range (that is, from impedance $R_A$ to impedance $R_Z$, as the lamp voltage varies from A volts to Z volts).

If the PWM signal has a fixed frequency throughout an entire operating range, the MPU may be able to directly apply the stored final duty cycle offset to the cycle of the PWM signal instead of applying the compensated final duty cycle to the values from lookup table.

Figure 3A:
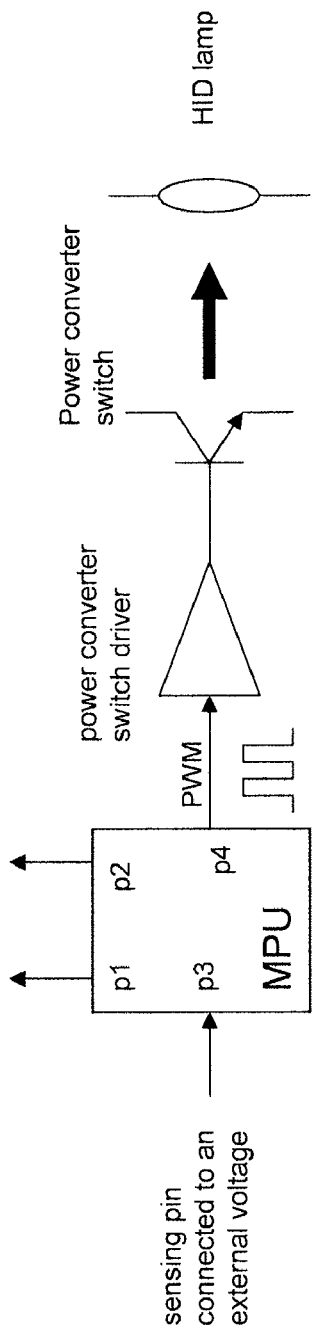
FIGS. 3A and 3B are schematic diagrams of embodiments of an electronic ballast of the present invention.
Figure 3B:
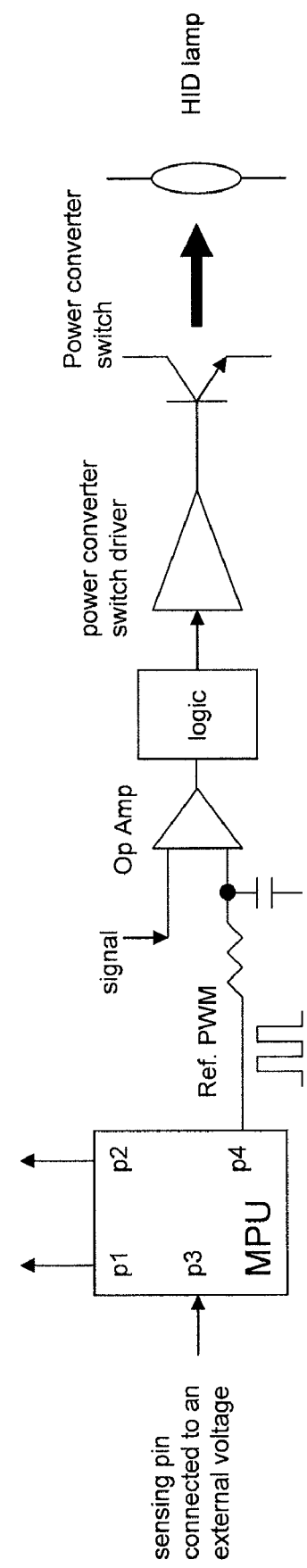

FIGS. 3A and 3B are schematic diagrams of embodiments of a ballast of the present invention. In the ballast shown in FIG. 3A, the MPU outputs the PWM signal directly to a power converter switch driver of the ballast. The power converter switch driver drives a power converter switch to output power via the output terminals LAMP1 and LAMP2. However, in the ballast shown in FIG. 3B, the MPU outputs the PWM signal to analog circuitry, the PWM signal is smoothed by a CR circuit, then output to an operational amplifier, where it is compared to another input signal. The output of the operational amplifier then controls the power converter switch driver. Both of the ballasts have lookup tables which have a number of values composed of the on-width of the PWM signal.

Figure 4:
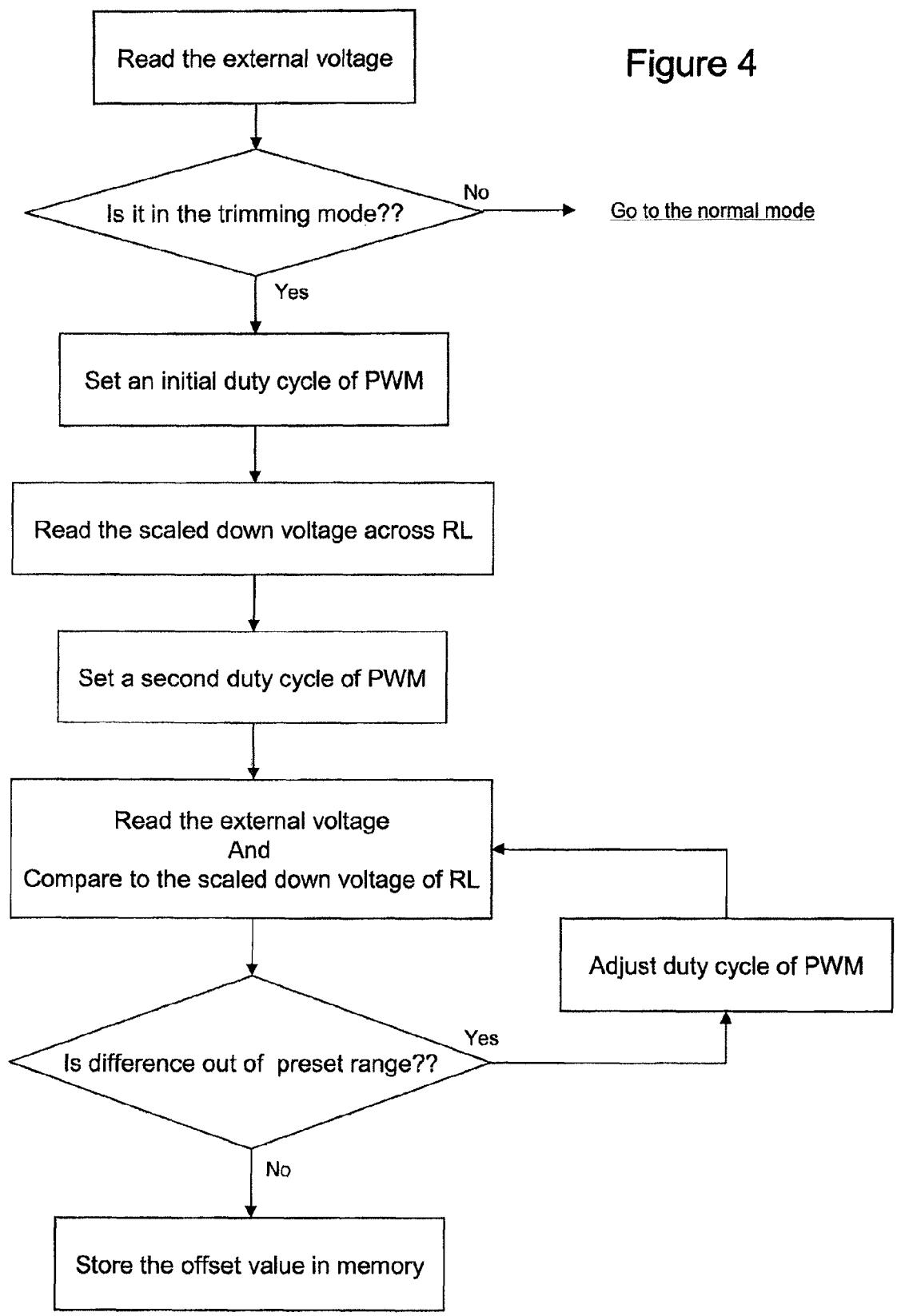
FIG. 4 is a flow chart depicting an embodiment of an algorithm which is performed by the MPU.

FIG. 4 is a flow chart depicting an embodiment of an algorithm which is performed by the MPU during a trimming mode, based upon a program it executes. The algorithm begins with the MPU reading an external voltage to judge if it is in the trimming mode or in the normal mode. After the MPU judges that it is in the trimming mode, the MPU sets an initial duty cycle of the PWM signal and the ballast outputs the power to the resistor RL. Then the MPU reads a scaled down voltage, corresponding to a voltage across the resistor RL. The MPU then sets a second duty cycle of the PWM signal based upon the scaled down voltage. The initial duty cycle of the PWM may be set to be the same as the second duty cycle of the PWM signal.

The MPU then reads the external voltage again, sets the internal reference value, and compares it to the scaled down voltage value. If a difference between the internal reference value and the scaled down voltage value is out of the preset range, the MPU adjusts the duty cycle of the PWM signal based upon the difference. This can be performed, for example, by applying a duty cycle offset to the second duty cycle.

The MPU continues to read the scaled down voltage value and compare it to the internal reference value until the difference between the internal reference value and the scaled down voltage value is in the preset range. When the difference between the internal reference value and the scaled down voltage value is within the preset range, the duty cycle of the PWM signal is at a final value, and the MPU stores the value of the final duty cycle or the final duty cycle offset in a memory.

Thus, using the above-described apparatus and method, the ballast output can be automatically and effectively trimmed to an acceptable level.

The foregoing embodiments are merely exemplary and are not to be construed as limiting the present invention. The description of the present invention is intended to be illustrative, and not to limit the scope of the claims. Many alternatives, modifications, and variations will be apparent to those skilled in the art.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term 'invention' merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

What is claimed is:

1. An electronic ballast, comprising:
an output voltage value reader which reads a voltage value corresponding to an output of the electronic ballast;
a power controller which outputs a signal which controls an amount of power outputted by the electronic ballast in accordance with the voltage value;
an external voltage value reader which reads an external voltage value;
an operating mode selector which selects one of a trimming mode and a normal mode as an operating mode based on the external voltage value;
an internal reference value setter which sets an internal reference value when the trimming mode is selected;
a comparator which determines a difference between the voltage value corresponding to the output of the electronic ballast and the internal reference value; and
a storage unit,
wherein the power controller trims an amount of power outputted by the electronic ballast to a resistor corresponding to an impedance of a High Intensity Discharge (HID) lamp by adjusting the signal based upon the difference; and
a result of the signal adjustment is stored in the storage unit.

2. An electronic ballast according to claim 1, wherein the internal reference value setter sets the internal reference value proportional to the external voltage value.

3. An electronic ballast according to claim 1, wherein the signal is a Pulse Width Modulation (PWM) signal.

4. An electronic ballast according to claim 3, wherein when operating in the trimming mode, the power controller adjusts a duty cycle of the PWM signal based upon the difference between the voltage value corresponding to the output of the electronic ballast and the internal reference value.

5. An electronic ballast according to claim 4, wherein when in the trimming mode, the power controller adjusts the duty cycle of the PWM signal if the difference between the voltage value corresponding to the output of the electronic ballast and the internal reference value is outside a preset range.

6. An electronic ballast according to claim 4, wherein when in the trimming mode, the power controller adjusts the duty cycle of the PWM signal by applying a duty cycle offset to a prior duty cycle of the PWM signal.

7. An electronic ballast according to claim 1, wherein when in the trimming mode, the power controller stores an offset value in a memory.

8. An electronic ballast according to claim 7, wherein the offset value is one of a final adjusted duty cycle and a final duty cycle offset.

9. An electronic ballast according to claim 1, wherein when operating in the normal mode, the power controller re-scales the result of the signal adjustment performed in the trimming mode based upon a difference between the impedance of the resistor and an impedance of an HID lamp connected to the electronic ballast in the normal mode.

10. An electronic ballast according to claim 1, wherein the external voltage source is provided in the electronic ballast.

11. An electronic ballast according to claim 1, wherein when operating in the normal mode, the power controller outputs a signal which controls an amount of power to an HID lamp in accordance with a voltage corresponding to the electronic ballast output and the result of the signal adjustment performed in the trimming mode.

12. A method for controlling an electronic ballast, comprising:
reading a voltage value corresponding to an output of the electronic ballast;
outputting a signal which controls an amount of power outputted by the electronic ballast in accordance with the voltage value;
reading an external voltage value;
selecting a trimming mode as an operating mode based on the external voltage value;
setting an internal reference value;
determining a difference between the voltage value corresponding to the output of the electronic ballast and the internal reference value;
trimming an amount of power outputted by the electronic ballast to a resistor corresponding to an impedance of a High Intensity Discharge (HID) lamp by adjusting the signal based upon the difference; and
storing a result of the signal adjustment.

13. A method according to claim 12, wherein setting the internal reference value comprises setting the internal reference value proportional to the external voltage value.

14. A method according to claim 13, wherein the signal is a Pulse Width Modulation (PWM) signal, and the method further comprises adjusting a duty cycle of the PWM signal based upon the difference between the voltage value corresponding to the output of the electronic ballast and the internal reference value.

15. A method according to claim 14, wherein the duty cycle is adjusted if the difference between the voltage value corresponding to the output of the electronic ballast and the internal reference value is outside a preset range.

16. A method according to claim 12, further comprising rescaling the result of the signal adjustment based upon a difference between the impedance of the resistor and an impedance of an HID lamp connected to the electronic ballast during a normal mode.

17. A method according to claim 12, further comprising outputting a signal which controls an amount of power to an HID lamp in accordance with a voltage corresponding to the electronic ballast output and the result of the signal adjustment.

18. A non-transitory computer-readable medium comprising a program for controlling an electronic ballast, the program comprising:
code for reading a voltage value corresponding to an output of the electronic ballast;
code for outputting a signal which controls an amount of power outputted by the electronic ballast in accordance with the voltage value;
code for reading an external voltage value;
code for selecting a trimming mode as an operating mode based on the external voltage value;
code for setting an internal reference value;
code for determining a difference between the voltage value corresponding to the output of the electronic ballast and the internal reference value;
code for trimming an amount of power outputted by the electronic ballast to a resistor corresponding to an impedance of a High Intensity Discharge (HID) lamp by adjusting the signal based upon the difference; and
code for storing a result of the signal adjustment.

19. A computer-readable medium according to claim 18, wherein the code for setting the internal reference value comprises code for setting the internal reference value proportional to the external voltage value.

20. A computer-readable medium according to claim 18, wherein the signal is a Pulse Width Modulation (PWM) signal, and the computer-readable medium further comprises code for adjusting a duty cycle of the PWM signal based upon the difference between the voltage value corresponding to the output of the electronic ballast and the internal reference value.

21. A computer-readable medium according to claim 20, wherein the duty cycle is adjusted if the difference between the voltage value corresponding to the output of the electronic ballast and the internal reference value is outside a preset range.

22. A computer-readable medium according to claim 18, further comprising code for rescaling the result of the signal adjustment based upon a difference between the impedance of the resistor and an impedance of an HID lamp connected to the electronic ballast during a normal mode.

23. A computer-readable medium according to claim 18, further comprising code for outputting a signal which controls an amount of power to an HID lamp in accordance with a voltage corresponding to the electronic ballast output and the result of the signal adjustment.

* * * * *